US012480069B2

(12) United States Patent
Ishizaki et al.

(10) Patent No.: US 12,480,069 B2
(45) **Date of Patent: *Nov. 25, 2025**

(54) MAGNETIC VISCOUS FLUID AND MECHANICAL DEVICE

(71) Applicant: SOMAR CORPORATION, Tokyo (JP)

(72) Inventors: Hirohisa Ishizaki, Tokyo (JP); Akira Ochiai, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/695,285

(22) PCT Filed: Nov. 1, 2023

(86) PCT No.: PCT/JP2023/039518

§ 371 (c)(1),
(2) Date: Mar. 25, 2024

(87) PCT Pub. No.: WO2024/106210

PCT Pub. Date: May 23, 2024

(65) Prior Publication Data

US 2024/0327745 A1 Oct. 3, 2024

(30) Foreign Application Priority Data

Nov. 18, 2022 (JP) ................................ 2022-185268

(51) Int. Cl.

| | |
|---|---|
| ***C10M 127/06*** | (2006.01) |
| ***C10M 105/38*** | (2006.01) |
| ***C10M 107/02*** | (2006.01) |
| ***C10M 111/04*** | (2006.01) |
| ***C10M 125/12*** | (2006.01) |
| ***C10M 125/26*** | (2006.01) |
| ***C10M 141/00*** | (2006.01) |
| ***C10M 155/02*** | (2006.01) |
| ***C10M 161/00*** | (2006.01) |
| ***C10M 169/04*** | (2006.01) |
| ***F16F 9/53*** | (2006.01) |
| ***H01F 1/44*** | (2006.01) |
| *C10N 40/08* | (2006.01) |
| *C10N 40/14* | (2006.01) |

(52) U.S. Cl.

CPC ...... *C10M 169/044* (2013.01); *C10M 105/38* (2013.01); *C10M 107/02* (2013.01); *C10M 111/04* (2013.01); *C10M 125/12* (2013.01); *C10M 125/26* (2013.01); *C10M 127/06* (2013.01); *C10M 141/00* (2013.01); *C10M 155/02* (2013.01); *C10M 161/00* (2013.01); *H01F 1/44* (2013.01); *C10M 2201/064* (2013.01); *C10M 2201/102* (2013.01); *C10M 2203/06* (2013.01); *C10M 2205/0206* (2013.01); *C10M 2207/2835* (2013.01); *C10M 2229/02* (2013.01); *C10N 2040/08* (2013.01); *C10N 2040/185* (2020.05)

(58) Field of Classification Search

CPC ... H01F 1/44; H01F 1/42; H01F 1/442; H01F 1/445; H01F 1/447; H01F 1/36; H01F 1/37; H01F 1/28; H01F 1/06; F16F 9/535; F16F 2224/045; C10N 2040/08; C10N 2040/185; C10M 171/001; C10M 169/044; C10M 105/38; C10M 107/02; C10M 111/04; C10M 125/12; C10M 125/26; C10M 127/06; C10M 141/00; C10M 155/02; C10M 161/00; C10M 2201/064; C10M 2201/102; C10M 2203/06; C10M 2205/0206; C10M 2207/2835; C10M 2229/02

See application file for complete search history.

(56) References Cited

U.S. PATENT DOCUMENTS

| | | | | |
|---|---|---|---|---|
| 3,984,918 | A * | 10/1976 | Chaney | E21B 47/022 73/514.09 |
| 4,976,883 | A * | 12/1990 | Kanno | H01F 1/44 252/62.52 |
| 5,507,967 | A | 4/1996 | Fujita et al. | |
| 5,516,445 | A | 5/1996 | Sasaki et al. | |
| 5,702,630 | A | 12/1997 | Sasaki et al. | |
| 8,182,712 | B1 * | 5/2012 | Maekawa | D06B 1/148 252/62.51 R |

(Continued)

FOREIGN PATENT DOCUMENTS

| | | | |
|---|---|---|---|
| CN | 109321337 | A | 2/2019 |
| JP | 2002-121578 | A | 4/2002 |

(Continued)

OTHER PUBLICATIONS

Machine translation of JP2016213301A, 12 pages. (Year: 2016).*
Machine translation of JP2013127013A, 13 pages. (Year: 2013).*
Shin-Etsu Silicone, https://www.shinetsusilicone-global.com/info/begin4.shtml, 1 page. (Year: 2025).*
https://www.csidesigns.com/uploads/resources/Viscosity-Chart.pdf, 1 page. (Year: 2025).*
International Search Report for PCT/JP2023/039518 (PCT/ISA/210) mailed on Dec. 26, 2023.

(Continued)

*Primary Examiner* — Matthew E. Hoban
*Assistant Examiner* — Lynne Edmondson
(74) *Attorney, Agent, or Firm* — Birch, Stewart, Kolasch & Birch, LLP

(57) ABSTRACT

The present invention provides a magnetic viscous fluid and a mechanical device with both improved drag force during excitation and improved rubber-resistant properties. The magnetic viscous fluid comprises a magnetic particle and base oil, wherein the base oil comprises ester base oil and non-polar base oil, and a non-polarity index of the base oil is in the range of 10 to 45.

6 Claims, 1 Drawing Sheet

(56) References Cited

U.S. PATENT DOCUMENTS

| | | | | |
|---|---|---|---|---|
| 2002/0130305 | A1 | 9/2002 | Iyengar et al. | |
| 2003/0111634 | A1 | 6/2003 | Foister et al. | |
| 2004/0119045 | A1 | 6/2004 | Hata et al. | |
| 2004/0195540 | A1* | 10/2004 | Tsuda | H01F 1/44 252/62.55 |
| 2005/0087408 | A1 | 4/2005 | Namuduri et al. | |
| 2011/0121223 | A1 | 5/2011 | Ulicny et al. | |
| 2011/0166051 | A1 | 7/2011 | Mizrahi et al. | |
| 2013/0126798 | A1* | 5/2013 | Nakatani | C09K 23/00 252/514 |
| 2019/0040924 | A1 | 2/2019 | Komori et al. | |
| 2020/0234859 | A1 | 7/2020 | Yamada et al. | |
| 2020/0312504 | A1 | 10/2020 | Ishizaki et al. | |
| 2021/0398721 | A1 | 12/2021 | Sakamoto | |

FOREIGN PATENT DOCUMENTS

| | | | | |
|---|---|---|---|---|
| JP | 2006-521693 | A | | 9/2006 |
| JP | 2006-303182 | A | | 11/2006 |
| JP | 2013127013 | A | * | 6/2013 |
| JP | 2016-213301 | A | | 12/2016 |
| JP | WO2017/047681 | A1 | | 3/2017 |
| JP | 2017-92119 | A | | 5/2017 |
| JP | 2017-92120 | A | | 5/2017 |
| JP | 2019-33221 | A | | 2/2019 |
| JP | 2019-33222 | A | | 2/2019 |
| JP | 2020-105449 | A | | 7/2020 |
| JP | 2021-163969 | A | | 10/2021 |
| KR | 10-2001-0024058 | A | | 3/2001 |
| KR | 10-2010-0081799 | A | | 7/2010 |
| KR | 10-2016-0145666 | A | | 12/2016 |
| KR | 10-2017-0068137 | A | | 6/2017 |
| TW | 202041658 | A | | 11/2020 |
| WO | WOI 02/095773 | A1 | | 11/2002 |
| WO | WO 2004/086426 | A1 | | 10/2004 |
| WO | WO 2023/008359 | A1 | | 2/2023 |

OTHER PUBLICATIONS

Written Opinion of the International Searching Authority for PCT/JP2023/039518 (PCT/ISA/237) mailed on Dec. 26, 2023.

German Office Action for corresponding German Application No. 11 2023 000 290.8, dated Oct. 28, 2024, with English translation.

International Preliminary Report on Patentability and English translation of the Written Opinion of the International Searching Authority (Forms PCT/IB/338, PCT/IB/373 and PCT/ISA/237) for International Application No. PCT/JP2022/042929, dated May 30, 2024.

International Preliminary Report on Patentability and English translation of the Written Opinion of the International Searching Authority (Forms PCT/IB/373 and PCT/ISA/237) for International Application No. PCT/JP2022/042928, dated May 2, 2024.

International Search Report (Form PCT/ISA/210) for International Application No. PCT/JP2022/042928, dated Jan. 31, 2023, with an English translation.

International Search Report (Form PCT/ISA/210) for International Application No. PCT/JP2022/042929, dated Jan. 31, 2023, with an English translation.

Korean Office Action for corresponding Korean Application No. 10-2024-7018216, dated Jul. 16, 2024, with an English translation.

Korean Office Action for Korean Application No. 10-2024-7018215, dated Jul. 16, 2024, with an English translation.

Taiwanese Office Action and Search Report for corresponding Taiwanese Application No. 111144068, dated Jul. 9, 2024, with an English translation.

Taiwanese Office Action and Search Report for Taiwanese Application No. 111144069, dated May 27, 2024, with an English translation.

U.S. Office Action for U.S. Appl. No. 18/710,697, dated Nov. 21, 2024.

U.S. Office Action for U.S. Appl. No. 18/711,269, dated Nov. 22, 2024.

Chinese Office Action and Search Report for corresponding Chinese Application No. 202380013759.0, dated Mar. 19, 2025, with an English translation.

U.S. Office Action for U.S. Appl. No. 18/710,697, dated Jul. 11, 2025.

U.S. Office Action for U.S. Appl. No. 18/711,269, dated Jul. 22, 2025.

* cited by examiner

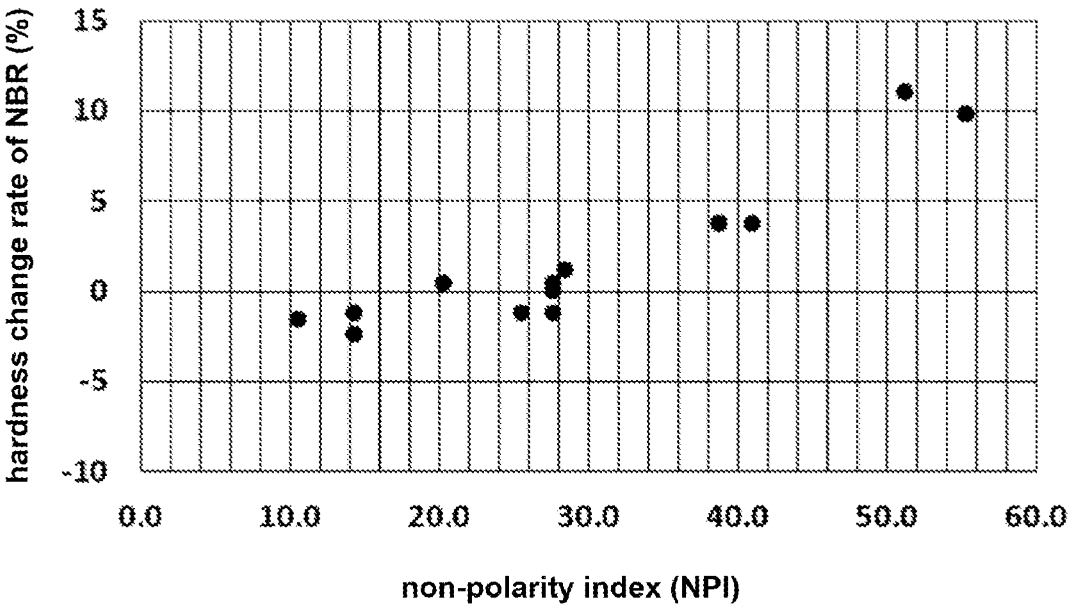
hardness change rate of NBR (%)
15
10
5
0
-5
-10
0.0
10.0
20.0
30.0
40.0
50.0
60.0
non-polarity index (NPI)

MAGNETIC VISCOUS FLUID AND MECHANICAL DEVICE

FIELD OF THE INVENTION

The present invention relates to a magnetic viscous fluid and a mechanical device. In particular, it relates to a magnetic viscous fluid for use of controlling frictional forces acting between objects in the mechanical device, and a mechanical device comprising the magnetic viscous fluid. Examples of the mechanical device include brakes, clutches, and dampers of anti-vibration devices or vibration suppression devices, and others.

BACKGROUND OF THE INVENTION

A magnetic viscous (Magneto-Rheological (MR)) fluid is a fluid in which magnetic particles, which are magnetizable metal particles, are dispersed in a dispersion medium. When no magnetic field is applied to a magnetic viscous fluid, magnetic particles are randomly suspended in the dispersion medium and it functions as a fluid. On the other hand, when a magnetic field is applied to the magnetic viscous fluid, the magnetic particles form numerous clusters and thicken, causing an internal stress to increase.

The magnetic viscous fluid acts like a rigid body due to the increase in the internal stress described above, and exhibits drag force against shear flow and pressure flow. Because of having these characteristics, the magnetic viscous fluid is used in various mechanical devices to control the frictional force between objects in the mechanical devices such as brakes, clutches, and dampers of anti-vibration devices or vibration suppression devices.

Therefore, it is preferable to have a large drag force (hereinafter referred to as "drag force during excitation") against shear flow and pressure flow when a magnetic field is applied to the magnetic viscous fluid (during excitation). The drag force during excitation is evaluated by measuring torque value, viscosity, or shear stress, and others. In this specification, drag force during excitation is evaluated by measuring viscosity during excitation.

The magnetic viscous fluid has various properties, including the drag force during excitation described above. In recent years, technologies have been developed to improve various properties of the magnetic viscous fluid by preparing dispersion medium of the magnetic viscous fluid. As such technologies, Patent Literature 1 discloses a magnetic viscous fluid composition comprising a monoester, magnetic particles, a dispersing agent, and a rheology control agent. According to this composition, it is possible to provide a magnetic viscous fluid composition with low viscosity when the magnetic field is off, but with suppressed evaporation and excellent flowability at low temperatures.

Patent Literature 2 discloses a magnetic viscous fluid, in which a specific gravity and a kinematic viscosity of a dispersion medium are controlled within predetermined ranges, and an average primary particle diameter, a density, and mass fraction of magnetic particles are controlled within predetermined ranges. It is stated that, according to such a configuration, it is possible to provide a magnetic viscous fluid in which sedimentation of magnetic particles can be significantly suppressed without changing the kinematic viscosity of the dispersion medium.

CITATION LIST

Patent Literatures

[Patent Literature 1] Japanese Patent Application Publication No. 2017-92119 A

[Patent Literature 2] Japanese Patent Application Publication No. 2021-163969 A

SUMMARY OF THE INVENTION

Rubber is used as sealing materials for O-rings, oil seals, packings, and other sealing materials in mechanical devices such as brakes, clutches, dampers of anti-vibration devices or vibration suppression devices, where the magnetic viscous fluid is used. In this process, the rubber comes into contact with the magnetic viscous fluid, and the dispersion medium included in the magnetic viscous fluid may cause the rubber to deteriorate from the contact area. Deterioration of the rubber used in sealing materials for O-rings, oil seals, packings, and others leads to failure of mechanical devices.

Therefore, the magnetic viscous fluid is required not only to improve drag force during excitation, but also to suppress the deterioration of rubber (hereinafter referred to as "rubber-resistant characteristics"). However, there has been no conventional technology to improve both the drag force during excitation and the rubber-resistant characteristics.

The present invention is developed in view of the above points. The purpose of the present invention is to provide a magnetic viscous fluid and a mechanical device with both improved drag force during excitation and improved rubber-resistant properties.

The above problem is solved by the following present invention, and the present invention is specified as following (1) to (5):

(1) A magnetic viscous fluid comprising a magnetic particle and base oil, wherein the base oil comprises ester base oil and non-polar base oil, and a non-polarity index of the base oil is in the range of 10 to 45.

(2) The magnetic viscous fluid according to (1), wherein the ester base oil is at least one selected from a hindered ester and a dibasic acid ester.

(3) The magnetic viscous fluid according to (1) or (2), further comprising an alkylbenzene having an alkyl group with 10 to 24 carbons and/or an alkylnaphthalene having an alkyl group with 10 to 24 carbons.

(4) The magnetic viscous fluid according to any one of (1) to (3), further comprising an inorganic cation exchanger with a siloxane bond and silicone oil.

(5) A mechanical device comprising the magnetic viscous fluid according to any one of (1) to (4).

According to an embodiment of the present invention, it is possible to provide a magnetic viscous fluid and a mechanical device with both improved drag force during excitation and improved rubber-resistant properties.

BRIEF DESCRIPTION OF THE DRAWINGS

FIG. 1 shows a relationship between a non-polarity index and a hardness change rate of NBR of Examples 1 to 4, 7 to 14, and Comparative Examples 1 to 3 in Tables 1 and 2.

DETAILED DESCRIPTION OF THE INVENTION

Hereinafter, embodiments of a magnetic viscous fluid and a mechanical device according to the present invention will be described. It is to understand that the present invention is not limited to the following embodiments, and various changes, modifications and improvements may be made based on ordinary knowledge of a person skilled in the art, without departing from the scope of the present invention.

In this specification, a symbol of "~" representing a numerical value range indicates a range that includes the numerical values listed as the upper and lower limits of the range, respectively. When units are listed only for the upper limit in a numerical value range, it means that the lower limit is also in the same units as the upper limit.

In the numerical value ranges described herein in steps, the upper or lower limits described in a certain numerical value range may be replaced by the upper or lower limits of the other stepwise described numerical value range.

In the numerical value ranges described herein, the upper or lower limits described in a certain numerical value range may be replaced by the values shown in the Examples.

In this specification, a content rate or a content amount of each component in a composition means, when multiple substances corresponding to each component are present in the composition, the total content rate or content amount of such multiple substances present in the composition, unless otherwise specified.

(Magnetic Viscous Fluid)

The magnetic viscous fluid of the present embodiment is a colloidal fluid containing a magnetic particle and base oil, in which the magnetic particles are dispersed in the base oil. The base oil contains ester base oil and non-polar base oil. Magnetic particles in the magnetic viscous fluid are suspended in the base oil before excitation and cluster along the magnetic field when a magnetic field is applied (excitation). The base oil acts as a resistance to clustering. Ester base oil is synthetic oil and has a more uniform molecular structure than mineral oil, and others. Therefore, when a magnetic field is applied, a physical resistance between the magnetic particles and the ester base oil is reduced. As a result, an ideal cluster is created and magnetic properties are increased. However, the ester base oil must have polarity for the sedimentation stability of magnetic particles, but most ester base oils with polarity tend to swell the rubber. In contrast, the magnetic viscous fluid of the present embodiment has magnetic particles dispersed in the base oil, and the base oil contains the ester base oil and the non-polar base oil that has the property of shrinking rubber, thus improving both the drag force during excitation and the rubber-resistant characteristics.

The base oil included in the magnetic viscous fluid of the present embodiment comprises an ester base oil and a non-polar base oil. The ester base oil has a property of swelling rubber, while the non-polar base oil has a property of shrinking rubber. By mixing the ester base oil and the non-polar base oil, which have opposite properties, the non-polarity index, which is composed of the ester base oil and the non-polar base oil in the magnetic viscous fluid, can be adjusted to a predetermined range, thereby favorably suppressing degradation of rubber in contact with the magnetic viscous fluid.

The non-polarity index is calculated according to the following formula (A).

$$\text{"Non-polarity index"} = \left[(\text{Number of carbon atoms} \times \text{Molecular weight}) / (\text{Number of ester groups} \times 100)\right] \times \left[(\text{Ester base oil content}) / (\text{Ester base oil content} + \text{Non-polar base oil content})\right] \quad (A)$$

(In the above formula (A), "Number of carbon atoms" represents the number of carbon atoms constituting the ester base oil, "Molecular weight" represents the molecular weight of the ester base oil, and "Number of ester groups" represents the number of ester groups in one ester molecule.)

In the present invention, "deterioration of rubber" means that an absolute value of a hardness change rate of the rubber becomes larger than 5% after being in contact with the magnetic viscous fluid for a predetermined time. In the magnetic viscous fluid of the present embodiment, the non-polarity index is in the range of 10 to 45, preferably in the range of 15 to 40, and more preferably in the range of 20 to 40. The non-polarity index of 45 or less can suppress a deterioration of rubber, and a non-polarity index of 10 or more can improve a sedimentation suppression effect of magnetic particles as well as drag force during excitation. A calculation method of the hardness change rate of rubber is described below.

Rubbers that can suppress degradation in the present invention are not limited to, but acrylonitrile butadiene rubber (hereinafter referred to as "NBR"), styrene butadiene rubber (SBR), chloroprene rubber (CR), silicon rubber, urethane rubber, and others. Among these, NBR is especially suitably used as sealing materials for O-rings, oil seals, packings, and others in various mechanical devices such as brakes, clutches, dampers of anti-vibration devices or vibration suppression devices, and the magnetic viscous fluid of the present invention exhibits particularly good rubber resistant properties.

The followings are descriptions of each component in the magnetic viscous fluid of the present embodiment.

1. Magnetic Particle

The magnetic particles included in the magnetic viscous fluid of the present embodiment can be selected according to a desired magnetic permeability. For example, ferromagnetic oxides such as magnetite, carbonyl iron, gamma iron oxide, manganese ferrite, cobalt ferrite, or composite ferrite with zinc or nickel, barium ferrite, and others; ferromagnetic metals such as iron, cobalt, and rare earths and others; nitride metals; various alloys such as Sendust (registered trademark), Permalloy (registered trademark), Super Permalloy (registered trademark), and others. Among these, carbonyl iron is preferred in that it is a soft magnetic material with low coercive force and high permeability. Carbonyl iron is a high-purity metallic particle produced by thermal decomposition of pentacarbonyl iron ($Fe(CO)_5$).

One type of the magnetic particle may be used alone, or two or more may be used in combination.

In the magnetic viscous fluid of the present embodiment, when an external magnetic field is applied, dispersed magnetic particles are oriented in the direction of the magnetic field to form chain-like clusters, thereby thickening the fluid and changing its flow characteristics and yield stress. An average particle diameter of the magnetic particles is determined so that they exhibit such behaviors. Specifically, the range of 0.1 to 100 μm is preferred, 1 to 80 μm is more preferred, 5 to 60 μm is even more preferred, 10 to 50 μm is even more preferred, and 10 to 40 μm is most preferred. A shape of the magnetic particles is preferably spherical or nearly spherical to facilitate dispersion.

The average particle diameter of the magnetic particles is an average primary particle diameter as measured by a laser diffraction/scattering particle size distribution analyzer.

A content rate of the magnetic particles is preferably in the range of 30 to 90 mass % of the total amount of the magnetic viscous fluid of the present embodiment. By setting the content rate of the magnetic particles in the range of 30 to 90 mass % of the total amount of the magnetic viscous fluid of the present embodiment, a necessary drag force can be obtained when a magnetic field is applied, and a dispersibility of the magnetic particles can be maintained, thereby the magnetic viscous fluid also functions as a fluid. The content rate of the magnetic particles is more preferably in the range of 40 to 85 mass %, even more preferably in the range of 45 to 80 mass %, and most preferably in the range of 50 to 75 mass %.

2. Base Oil

The base oil included in the magnetic viscous fluid of the present embodiment comprises an ester base oil, a non-polar base oil, and certain alkylbenzenes and alkylnaphthalenes added as desired. The ester base oil, non-polar base oil, specific alkylbenzenes and alkylnaphthalene are described in detail below.

2-1. Ester Base Oil

The ester base oil included in the magnetic viscous fluid of the present embodiment is a polar base oil, and the ester base oil is an ester group-containing compound having an ester group (—C(═O)—O—). Examples of the ester base oil include monoesters, polyol esters, dibasic acid esters (diesters), and polyoxyalkylene glycol esters, and others. One of these ester base oils may be used alone, or two or more may be used in combination.

Among these, monoesters with 12 to 30 carbons are preferred, for example, 2-ethylhexyl laurate, 2-ethylhexyl palmitate, n-butyl stearate, and others. Polyol esters are esters of polyhydric alcohols (polyols) and linear or branched-chain saturated or unsaturated fatty acids. Examples of polyol esters include hindered esters.

2-1-1. Hindered Ester

The ester base oil included in the magnetic viscous fluid of the present embodiment will be explained in detail using the hindered ester as an example. The hindered ester is an ester of a hindered polyol having one or more quaternary carbons in the molecule and one to four methylol groups bonded to at least one of the quaternary carbons, and an aliphatic monocarboxylic acid.

Hindered polyols include, for example, trimethylolpropane (TMP), pentaerythritol (PE), dipentaerythritol (DPE), neopentylglycol (NPG), 2-methyl-2-propyl-1,3-propanediol (MPPD), and others.

Among these hindered polyols, trimethylolpropane, pentaerythritol, and dipentaerythritol are preferred because of a higher flash point of a resulting hindered ester. Trimethylolpropane is preferred because of a lower flow point of a resulting hindered ester.

Aliphatic monocarboxylic acids with 5-15 carbons are preferred. The acyl groups of these monocarboxylic acids may be linear or branched-chain. Examples of the aliphatic monocarboxylic acids include valeric acid, caproic acid, caprylic acid, enanthate, perargonic acid, capric acid, undecanoic acid, lauric acid, myristic acid, undecylenic acid, linderic acid, tinic acid, fizetellic acid, myristoleic acid, sorbic acid and sabinic acid, and others. One of these aliphatic monocarboxylic acids may be used alone or in combination with two or more of them during esterification. The carbon number of the aliphatic monocarboxylic acid is more preferably in the range of 5 to 12. The carbon number of the aliphatic monocarboxylic acid is more preferably 5 or more because of a higher flash point of a resulting hindered ester. The number of carbons of the aliphatic monocarboxylic acid is more preferably 15 or less because of an improved solubility parameter of a resulting hindered ester. The number of carbons of the aliphatic monocarboxylic acid is even more preferably in the range of 6 to 10, and most preferably in the range of 7 to 9.

The carbon number of the fatty acid above includes the carbon atom of the carboxy group (—COOH) possessed by the fatty acid.

2-1-2. Dibasic Acid Ester

The ester base oil included in the magnetic viscous fluid of the present embodiment will be explained in detail using the dibasic acid ester as an example.

The dibasic acid esters include esters of dicarboxylic acids with 2 to 10 carbon atoms and alcohols with 1 to 10 carbon atoms.

The dicarboxylic acids with 2 to 10 carbon atoms include, for example, aliphatic dicarboxylic acids such as oxalic acid, malonic acid, succinic acid, glutaric acid, 2-methylglutaric acid, adipic acid, pimelic acid, suberic acid, azelaic acid, and sebacic acid, and others, and aromatic dicarboxylic acids such as phthalic acid, isophthalic acid, and terephthalic acid, and others.

The alcohols with 1 to 10 carbon atoms include methanol, ethanol, propanol, isopropanol, butanol, isobutanol, hexanol, octanol, 2-ethyl hexanol, isononyl alcohol, decyl alcohol and isodecyl alcohol, and others. Among the dibasic acid esters, esters of dicarboxylic acids with 6 to 10 carbon atoms such as diisobutyl adipate, di(2-ethylhexyl) adipate (DOA), diisodecyl adipate (DIDA), diisononyl adipate (DINA), bis (2-ethylhexyl) azelaic acid (DOZ), di(2-ethylhexyl) sebacate (DOS) and alcohols with 4 to 10 carbon atoms are preferred. One of these dicarboxylic acids and alcohols may be used alone or in combination with two or more of them during esterification.

Unless otherwise mentioned, the carbon number of aliphatic dicarboxylic acid in the present invention includes the carbon atom of the carboxy group (—COOH) of the aliphatic dicarboxylic acid. One of these dibasic acid esters may be used alone or in combination with two or more of them.

The ester base oil included in the magnetic viscous fluid of the present embodiment preferably has a kinematic viscosity at 40° C. of 50.0 $mm^2/s$ or less, more preferably in the range of 10.0 to 50.0 $mm^2/s$, and most preferably in the range of 10.0 to 4.0 $mm^2/s$. It is preferred that the kinematic viscosity of the ester base oil at 40° C. be 50.0 $mm^2/s$ or less to facilitate dispersion of the magnetic particles.

The kinematic viscosity is a kinematic viscosity measured in accordance with JIS K2283:2000 (kinematic viscosity test method).

The ester base oil included in the magnetic viscous fluid of the present embodiment preferably has a flash point of 200° C. or higher, and more preferably 250° C. or higher.

If the flash point of the base oil is 200° C. or higher, a classification of the base oil composition under the Fire Service Law is changed from Class 3 Petroleum to Class 4 Petroleum, which is more desirable because it allows for an increase in the amount of hazardous materials handled (designated quantity). The flash point is a flash point measured in accordance with JIS K2265-4:2007 (Cleveland Open-Circuit (COC) method).

The ester base oil included in the magnetic viscous fluid of the present embodiment preferably has a flow point of −10° C. or less, more preferably −20° C. or less, especially preferably −30° C. or less, and most preferably −50° C. or less. A flow point of −10° C. or less is preferred for its excellent low-temperature flowability. The flow point is a flow point measured in accordance with JIS K2269:1987.

The solubility parameter of the ester base oil is preferably in the range of 8.5 to 12.0 $(cal/cm^3)^{1/2}$, more preferably in the range of 8.8 to 11.0 $(cal/cm^3)^{1/2}$, and most preferably in the range of 9.0 to 10.0 $(cal/cm^3)^{1/2}$. A solubility parameter of 8.5 $(cal/cm^3)^{1/2}$ or more is more preferred because it makes the ester base oil incompatible with silicone oil described below. A solubility parameter of 12.0 $(cal/cm^3)^{1/2}$ or less is preferred because it improves a heat resistance of the ester base oil.

The solubility parameter (SP value) can be calculated according to the method (see "Polymer Engineering and Science, 14, 147-154 (1974)") proposed by Fedors et al. In other words, it can be calculated based on the following formula (B).

$$SP \text{ value } \delta = (\Sigma\Delta e/\Sigma\Delta v)^{1/2} \quad \text{(B)}$$

(In the above formula (B), Δe is an evaporation energy of each atom or atomic group at 25° C., and Δv is a molar volume of each atom or atomic group at the same temperature.)

2-2. Non-Polar Base Oil

The non-polar base oil included in the magnetic viscous fluid of the present embodiment is a non-polar oil material consisting only of carbon and hydrogen, and examples of the non-polar base oil is mineral oils such as paraffinic mineral oil and naphthenic mineral oil, polyalpha olefin (PAO), alpha olefin, synthetic naphthenic oils, and polybutene oils, and others. Among these, polyalpha olefin is preferred because of its excellent heat resistance and high viscosity index. One of these non-polar base oils may be used alone, or two or more may be used in combination.

Among these, compounds with rings selected from cyclohexane ring, bicycloheptane ring, and bicyclooctane ring are preferred as naphthenic mineral oils.

The polyalphaolefin is a polyalphaolefin or a hydride thereof obtained by polymerizing at least one type of alpha olefin in the degree of polymerization range of 2 to 10.

The polyalphaolefin may be a monopolymer of alphaolefin, a copolymer of two or more alphaolefins, or a hydride of these.

The alphaolefin as a raw material may be linear or branched, but the linear is preferred. The carbon numbers of the alphaolefin are not particularly limited, but for example, 8 to 12 is preferred, and 10 is more preferred. Linear chain alphaolefins having 8 to 12 carbons include 1-octene (8 carbons), 1-nonene (9 carbons), 1-decene (10 carbons), 1-undecene (11 carbons), 1-dodecene (carbon number: 12). When the carbon number of the raw material, alphaolefin, is between 8 and 12, the flash point of the resulting polyalphaolefin is higher, which is desirable because of its excellent flowability in the low temperature range.

The upper and lower limit values of the content rate of the non-polar base oil included in the magnetic viscous fluid of the present embodiment are controlled so that the non-polarity index of the base oil is in the range of 10 to 45. The content rate of the non-polar base oil can usually be set as appropriate from 3 to 20% by mass, preferably 4 to 15% by mass, and more preferably from 4 to 10% by mass.

The non-polar base oil included in the magnetic viscous fluid of the present embodiment preferably has a kinematic viscosity at 40° C. of 50.0 $mm^2/s$ or less, more preferably in the range of 10.0 to 50.0 $mm^2/s$, and most preferably in the range of 10.0 to 4.0 $mm^2/s$. It is preferred that the kinematic viscosity of the ester base oil at 40° C. be 50.0 $mm^2/s$ or less to facilitate dispersion of the magnetic particles.

The kinematic viscosity is a kinematic viscosity measured by the same method as for the ester base oil.

The non-polar base oil included in the magnetic viscous fluid of the present embodiment has a flash point of 200° C. or higher, and more preferably 250° C. or higher.

If the flash point of the base oil is 200° C. or higher, a classification of the base oil composition under the Fire Service Law is changed from Class 3 Petroleum to Class 4 Petroleum, which is more desirable because it allows for an increase in the amount of hazardous materials handled (designated quantity). The flash point is a flash point measured by the same method as for the ester base oil.

The non-polar base oil included in the magnetic viscous fluid of the present embodiment preferably has a flow point of −10° C. or less, more preferably-20° C. or less, especially preferably −30° C. or less, and most preferably −50° C. or less. A flow point of −10° C. or less is preferred for its excellent low-temperature flowability. The flow point is a flow point measured by the same method as for the ester base oil.

The magnetic viscous fluid of the present invention may contain another base oil in addition to the ester base oil and the non-polar base oil to the extent that the effect of the present invention is not impaired. Base oils other than the ester base oil and the non-polar base oil include higher fatty acids, higher alcohols, polyhydric alcohols, ether base oil, and others.

2-3. Alkylbenzene having Alkyl Groups with 10 and 24 Carbons, Alkylnaphthalene having Alkyl Groups with 10 and 24 Carbons The magnetic viscous fluid of the present embodiment preferably contains alkylbenzene having alkyl groups with 10 to 24 carbons and/or alkylnaphthalene having alkyl groups with 10 to 24 carbons. The alkylbenzene and the alkylnaphthalene may be used alone or in combination. The alkylbenzene and the alkylnaphthalene each function as a lubricating auxiliary agent that improves the lubricity of the magnetic viscous fluids. The alkylbenzene and the alkylnaphthalene, and the ester base oil, are polar and compatible with each other.

The alkylbenzene having an alkyl group with 10 to 24 carbons is an aromatic hydrocarbon having an alkyl group with 10 to 24 carbons bonded to one benzene ring. The alkyl group may be linear or branched. The alkyl group may be single bonded or multiple bonded to the benzene ring. Alkylbenzenes include monoalkylbenzenes, dialkylbenzenes, trialkylbenzenes, and tetraalkylbenzenes, and others. In alkyl groups of the alkylbenzene, 10 to 20 carbons are preferred, 12 to 18 carbons are more preferred, and 13 to 18 carbons are even more preferred.

The alkylbenzenes have preferably 1 to 4 alkyl groups bonded to the benzene ring. The alkylbenzenes have preferably 10 to 40 total carbons of alkyl groups bonded to the benzene ring, more preferably 10 to 30 total carbons of alkyl groups, and even more preferably 10 to 20 total carbons of alkyl groups bonded to the benzene ring.

The alkyl groups include decyl group, undecyl group, dodecyl group, tridecyl group, tetradecyl group, heptadecyl group, octadecyl group, nonadecyl group, icosyl group, henicosyl group, docosyl group, tricosyl group, and tetracosyl group, and others.

One alkylbenzene having the alkyl group with 10 to 24 carbons may be used alone, or two or more may be used in combination.

Specific examples of the alkylbenzenes having alkyl groups with 10 and 24 carbons for use in the magnetic viscous fluid of the present embodiment are not limited, as long as it functions as the lubricating auxiliary agent as described above, for example, to decylbenzene, undecylbenzene, dodecylbenzene, tridecylbenzene, tetradecylbenzene, hexadecylbenzene, heptadecylbenzene, octadecylbenzene, nonadecylbenzene, icosylbenzene, henicosylbenzene, docosylbenzene, tricosylbenzene, tetracosylbenzene, and others.

The alkylnaphthalene with an alkyl group with 10 to 24 carbons is an aromatic hydrocarbon with an alkyl group bonded to one naphthalene ring. The alkyl group can be the same as the alkyl group bonded to the alkylbenzene above. The alkyl group with 10 to 24 carbons may be bonded to one naphthalene ring or may be bonded to more than one naphthalene ring.

The alkyl groups of the alkylnaphthalene have preferably 10 to 24 carbons, more preferably 12 to 18 carbons, and even more preferably 13 to 18 carbons. As alkylnaphthalene, one to four alkyl groups with 10 to 24 carbons bonded to the naphthalene ring are preferred.

One alkylnaphthalene having an alkyl group with 10 to 24 carbons may be used alone, or two or more may be used in combination.

Specific examples of the alkylnaphthalene for used in the magnetic viscous fluid of the present embodiment are not limited, as long as it functions as the lubricating auxiliary agent as described above, for example, to decylnaphthalene, undecylnaphthalene, dodecylnaphthalene, tridecylnaphthalene, tetradecylnaphthalene, heptadecylnaphthalene, hexadecylnaphthalene, octadecylnaphthalene, nonadecylnaphthalene, icosylnaphthalene, henicosylnaphthalene, docosylnaphthalene, tricosylnaphthalene, tetracosylnaphthalene, and others.

When alkylbenzene having an alkyl group with 10 to 24 carbons or alkylnaphthalene having an alkyl group with 10 to 24 carbons is contained alone, the lower limit of the content rate of such content, or when both alkylbenzene and alkylnaphthalene are contained, the content rate of the total amount of them is preferably 5% by mass or more, more preferably 5 to 25% by mass or more, even more preferably 10 to 25% by mass or more, most preferably 10 to 20% by mass or more, of the total amount of the base oil of the magnetic viscous fluid of the present embodiment. By setting the content rate to 5 mass % or more, a lubricity of the magnetic viscous fluid can be further improved and the polarity of the magnetic viscous fluid can be further improved. By setting the content rate to 25 mass % or less, the relative content of the ester base oil can be suppressed from decreasing too much, and the sedimentation suppression effect of the magnetic particles can be suppressed from decreasing.

The base oil included in the magnetic viscous fluid of the present embodiment preferably has a kinematic viscosity at 40° C. of 50.0 $mm^2/s$ or less, more preferably in the range of 10.0 to 40.0 $mm^2/s$. It is preferred that the kinematic viscosity of the base oil at 40° C. be 50.0 $mm^2/s$ or less to facilitate dispersion of the magnetic particles.

The kinematic viscosity is a kinematic viscosity measured by the same method as for the ester base oil.

The base oil base oil included in the magnetic viscous fluid of the present embodiment preferably has a flash point of 200° C. or higher, and more preferably 250° C. or higher.

If the flash point of the base oil is 200 C or higher, a classification of the base oil composition under the Fire Service Law is changed from Class 3 Petroleum to Class 4 Petroleum, which is more preferable because it allows for an increase in the amount of hazardous materials handled (designated quantity). The flash point is a flash point measured by the same method as for the ester base oil.

The base oil included in the magnetic viscous fluid of the present embodiment contains an ester base oil, a non-polar base oil, and certain alkylbenzenes and alkylnaphthalenes added as desired. In this case, the flash point means a flash point calculated from the Flash-Point Blending Index (FPI for short). Hereafter, when simply referred to "flash point," this means.

The flash point mixing index for calculating the flash point is obtained from the flash point mixing index table in Hydrocarbon Processing & Petroleum Refiner, June 1963, Vol. 42, No. 6. For example, the flash point of a mixture of oil A with a flash point of 190° F. (87.8° C.) and oil B with a flash point of 330° F. (165.6° C.) in a volume ratio of 30:70 is calculated as follows. Based on the flash point mixing index table in the above literature, the FPI of oil A is 30 and the FPI of oil B is 1.0. Calculating the FPI of the mixture by the FPI of each oil, "mixture FPI=(30/100)×(30)+(70/100)×(1.0)=9.7". Applying this FPI of 9.7 to the flash point mixture index, the flash point corresponding to FPI 9.7 can be estimated to be about 230° F. (110° C.).

The base oil included in the magnetic viscous fluid of the present embodiment preferably has a flow point of −10° C. or less, more preferably −20° C. or less, especially preferably −30° C. or less, and most preferably −50° C. or less. A flow point of −10° C. or less is preferred for its excellent low-temperature flowability. The flow point is a flow point measured by the same method as for the ester base oil.

A base oil content rate in the magnetic viscous fluid of the present embodiment is preferably 10 mass % or more, more preferably 10 to 70 mass %, even more preferably 20 to 70 mass %, most preferably 20 to 60 mass %, of the total amount of the magnetic viscous fluid of the present embodiment. The base oil content rate of 10 mass % or more can disperse the magnetic particles and improve the flowability. The base oil content rate of 70 mass % or less is more preferable in that it can improve the magnetic properties during excitation.

3. Inorganic Cation Exchanger with Siloxane Bond, Silicone Oil

The magnetic viscous fluid of the present embodiment preferably further includes an inorganic cation exchanger with a siloxane bond and a silicone oil. According to such a configuration, the drag force of the magnetic viscous fluid during excitation is further improved.

More specifically, the magnetic particles are dispersed in the base oil. Since the magnetic particles have cationic properties, they adsorb inorganic cation exchangers with siloxane bonds. In addition, silicone oil is dispersed without dissolving in the ester base oil, which has a low surface energy and a high solubility parameter. Furthermore, the inorganic cation exchanger with siloxane bond and silicone oil have high affinity because both have Si, and silicone oil is assumed to exist in a state surrounding the magnetic particles adsorbed with the inorganic cation exchanger with siloxane bond.

When a magnetic field is applied in this state, magnetic particles surrounded by silicone oil quickly combine and cluster together. The presence of silicone oil around the magnetic particles prevents excessive aggregation of the magnetic particles. Therefore, when the drag force (viscosity) is measured by applying a magnetic field, shear force is generated, but the clusters do not collapse, and it is assumed that the drag force is stable.

<Inorganic Cation Exchanger with Siloxane Bond>

Inorganic cation exchangers with siloxane bond include, for example, zeolite, silica, layered silicate, and others. Among these, zeolite is preferred for its wear resistance. One type of the inorganic cation exchanger with siloxane bond may be used alone or in combination with two or more types. Both natural and synthetic products can be used.

Zeolite is composed of a crystalline porous aluminosilicate backbone with anionic properties and a cationic metal element M adsorbed on the backbone. More specifically, the basic structural unit is $SiO_4$ and $AlO_4$, which have a tetrahedral structure, and these are connected three-dimensionally to form a crystal with pores (voids), and crystal water and cationic metallic element M are adsorbed in these voids. The crystal structure of zeolite is not limited to, specifically A-type zeolite, X-type zeolite, Y-type zeolite, L-type zeolite, beta zeolite, ZSM-5, ZSM-11, silicalite, ferrierite, mordenite, clinoptilolite, porringite, and others.

The layered silicate is a silicate compound that has a crystal structure consisting of planes composed of ionic bonds and other factors that are weakly bonded to each other and stacked in layers. The layered silicate often has a negative charge throughout the layers, and large cations enter between the layers to neutralize the negative charge. Because of the small layer charge, these cations are exchangeable with cations in solution and have cation-exchange properties. The layered silicate includes, for example, the smectite group (bentonite, montmorillonite, bidelite, nontronite, saponite, hectorite, and stevensite), vermiculite, kaolin group (kaolinite, halloysite, chrysotile, amesite), mica group (muscovite, biotite, ferric mica, phlogopite, albite, soda mica, siderophyllite, yeastite, polylithiotite, trilithiotite, lithian mica, chinwald mica, margarite, illite, sea curbstone), talc, parigorskite, sepiolite, magadiite, kanemite, kenyite, and synthetic fluorimica, and others. Among these, the smectite group, vermiculite, and synthetic fluorimica are preferred in terms of ion exchange capacity.

A cation exchange capacity of the inorganic cation exchanger with siloxane bond is preferably 30 meq/100 g or more, more preferably in the range of 30 to 400 meq/100 g, even more preferably in the range of 60 to 350 meq/100 g, even more preferably in the range of 60 to 300 meq/100 g, and most preferably in the range of 60 to 150 meq/100 g.

The cation exchange capacity of the inorganic cation exchangers with siloxane bond is 260 meq/100 g for mordenite, 120 meq/100 g for synthetic fluorimica, 60 to 150 meq/100 g for smectite group, 80 to 150 meq/100 g for montmorillonite, and 100 to 150 meq/100 g for vermiculite.

A content rate of the inorganic cation exchanger with siloxane bond is preferably 0.8 mass % or more, more preferably in the range of 0.8 to 4.0 mass %, even more preferably in the range of 1.0 to 3.5 mass %, most preferably in the range of 1.3 to 3.0 mass %, of the total magnetic viscous fluid of the present embodiment. The content rate of 0.8 mass % or more is more preferable in that it can suppress the agglomeration of the magnetic particles in a state where no magnetic field is applied. The content rate of 4.0 mass % or less is more preferable in that clusters of the magnetic particles can be appropriately formed when a magnetic field is applied.

<Silicone Oil>

Silicone oil can be used without restriction as long as it is incompatible with the ester base oil. Silicone oil can be broadly classified into straight silicone oil and modified silicone oil. Straight silicone oil includes dimethyl silicone oil, methyl phenyl silicone oil, and methyl hydrogensilicone oil. Modified silicone oil includes reactive silicone oil and non-reactive silicone oil. Reactive silicone oil includes, for example, amino-modified types, epoxy-modified types, carboxy-modified types, carbinol-modified types, methacryl-modified types, mercapto-modified types, phenolic-modified types, and other types of silicone oil. Non-reactive silicone oil includes polyether-modified types, methylstyryl-modified types, alkyl-modified types, higher fatty acid ester-modified types, hydrophilic specially modified types, higher fatty acids containing types, fluorine-modified types, and others. Among these, dimethyl silicone oil and fluorine-modified type silicone oil are preferred because of their low surface energy, and dimethyl silicone oil is more preferred for ease of availability.

The lower limit of the silicone oil content rate is preferably 0.5 mass % or more, more preferably 0.5 to 3.0 mass %, and most preferably 1.0 to 2.5 mass %, of the total amount of the magnetic viscous fluid of the present embodiment. The content rate of 0.5 mass % or more is preferred in that it can surround the magnetic particles to which the inorganic cation exchanger with siloxane bond is attached. The content rate of 3.0 mass % or less is preferred in that it can prevent a decrease in the dispersibility of the magnetic particles.

The mixing ratio of the inorganic cation exchanger with siloxane bond and silicone oil is preferably in the range of 2:8 to 8:2 by mass, and more preferably 3:7 to 7:3.

The mixing ratio in the range of 2:8 to 8:2 by mass is preferable in that it improves the aging stability of drag force during excitation.

An absolute value of the difference in solubility parameters between the ester base oil and the silicone oil is preferably 1.3 $(cal/cm^3)^{1/2}$ or more, more preferably 1.5 $(cal/cm^3)^{1/2}$ or more, and especially preferably 1.8 $(cal/cm^3)^{1/2}$ or more. If the absolute value of the difference in solubility parameters between the ester base oil and the silicone oil is 1.3 $(cal/cm^3)^{1/2}$ or more, it is more preferable to improve the incompatibility between the ester base oil and the silicone oil.

<Other Components>

In addition to the above-mentioned components, the magnetic viscous fluid of the present embodiment may be combined with various other components according to the purpose, to the extent that the effect of the present invention is not impaired.

Other components include, for example, anti-wear agents, dispersants, surfactants, viscosity regulators, flow improvers, sedimentation inhibitors, flow point depressants, extreme pressure agents, rust inhibitors, oxidation inhibitors, corrosion inhibitors, metal inactivators, defoaming agents, and others.

The anti-wear agents include, for example, sulfur compounds such as sulfides, sulfoxides, sulfones, thiophosphinates, and others, halogenated compounds such as chlorinated hydrocarbons, and others, organometallic compounds such as molybdenum dithiophosphate (MoDTP), molybdenum dithiocarbamate (MoDTC), tricresyl phosphate, and others.

One type of the anti-wear agents may be used alone or in combination with two or more.

The dispersants are added to improve the dispersibility of the magnetic particles in the base oil, and include known low molecular weight dispersants and high molecular weight dispersants, and others. One type of the dispersants may be used alone, or two or more may be used in combination.

The viscosity regulators include, for example, castor oil, hydrogenated castor oil, fatty acid amides, beeswax, carnaba wax, benzylidene sorbitol, metal soap, polyethylene oxide, sulfate anionic activator, polyolefin, (meth)acrylic acid esters, polyisobutylene, ethylene-propylene copolymer, polyalkylstyrene, and others.

One type of the viscosity regulators may be used alone, or two or more may be used in combination.

The flow improvers include modified silicone oil. For example, straight silicone oil are modified with alkyl, aralkyl, polyether, higher fatty acid esters, amino, epoxy, carboxyl, alcohol, and others. The modified silicone oil may be compatible with the ester base oil. One type of flow improvers may be used alone, or two or more may be used in combination.

<Viscosity of Magnetic Viscous Fluid>

A viscosity of the magnetic viscous fluid of the present embodiment before excitation is preferably in the range of 0.02 to 1.0 Pa·s at 40° C., more preferably in the range of 0.03 to 0.6 Pa·s. The measurement conditions for the viscosity before excitation are as follows.

Inject 3 ml of the magnetic viscous fluid into a test plate of a TA Instruments rheometer DHR-2 equipped with the magnetic measurement option, and measure the viscosity (Pa·s) at 20 revolutions of a 100 μm gap under an atmosphere of 40° C.

<Magnetic properties of Magnetic Viscous Fluids>

As described above, the magnetic viscous fluid of the present embodiment has the characteristic of high drag force during excitation. High drag force during excitation means that the maximum value of the viscosity of the magnetic viscous fluid of the present invention during excitation under the following conditions when the content ratio of the magnetic particles in the total amount of the magnetic viscous fluid is 64 to 67 mass % is 230 Pa·s or more. The maximum value of the viscosity during excitation is preferably 230 Pas or more, and more preferably 240 Pa·s or more.

As described above, excellent aging stability of drag force during excitation (viscosity aging stability) can be obtained by further including the inorganic cation exchanger with siloxane bond and silicone oil. Excellent aging stability of drag force during excitation (viscosity aging stability) means that a stabilization ratio B, described below, is 80% or more. A stabilization ratio A is preferably 70% or more, more preferably 80% or more, and especially preferably 90% or more.

The viscosity during excitation is a viscosity during 210 seconds that the magnetic field is applied, using the same measuring device that measured the viscosity before excitation, and under the same temperature atmosphere, applying a magnetic field of 0.8 T DC 5 seconds after the start of measurement and stopping the application of that magnetic field 215 seconds after the start of measurement.

The stabilization ratio A (%) is calculated based on the following formula.

$$\text{Stabilization rate } A\,(\%) = (\text{Stabilization time } A/\text{Total applied time}) \times 100$$

The stabilization time A is the time of application corresponding to 95 to 100% of the maximum value of the viscosity during excitation.

The stabilization ratio B (%) is calculated based on the following formula.

$$\text{Stabilization rate } B\,(\%) = (\text{Stabilization time } B/\text{Total applied time}) \times 100$$

The stabilization time B is the time of application corresponding to 90 to 100% of the maximum value of the viscosity during excitation.

(Method for Producing Magnetic Viscous Fluid)

A method for producing the magnetic viscous fluid of the present embodiment is not particularly limited. For example, magnetic particles, ester base oil, non-polar base oil, if necessary, alkylnaphthalene, inorganic cation exchanger with siloxane bond, silicone oil, and other components added if desired, are all mixed in various quantities, using a homogenizer, bead mill, mechanical mixer, or other high shear force processing machine. The ester base oil and the non-polar base oil are mixed so that the non-polarity index, which is composed of the ester base oil and the non-polar base oil, is in the specified range. The mixture may be heated or cooled as necessary in the production of the magnetic viscous fluid.

(Mechanical Device Comprising Magnetic Viscous Fluid)

The magnetic viscous fluid of the present embodiment can be applied to various mechanical devices such as brakes to control the frictional force between objects, clutches, and dampers of anti-vibration devices or vibration suppression devices. According to such a configuration, in various mechanical devices, the magnetic viscous fluid has a good drag force during excitation and the deterioration of the rubber in contact with the magnetic viscous fluid can be well suppressed.

EXAMPLES

The following examples of the present invention are provided to better understand the present invention and its advantages and are not intended to limit the invention.

Examples 1 to 14, Comparative Examples 1 to 3

Each of the components listed in Tables 1 to 3 was placed in a beaker based on the mass ratios listed therein and stirred at 40 Hz for 5 minutes at room temperature using a universal vibratory stirrer AD-MIX manufactured by Seiko Advance Inc. to produce magnetic viscous fluid. The raw materials for each component shown in Tables 1-3 are listed below.

(A) Magnetic particle (a1) Carbonyl iron (average particle size D50=6.0 μm)

(B) Ester base oil

<Hindered Ester>

(b1) Trimethylolpropane trioctanoate (SP value: 9.1 $(cal/cm^3)^{1/2}$, kinematic viscosity at 40° C.: 16.0 $mm^2/s$, flash point 260° C., flow point −57° C.)

<Dibasic Acid Ester>

(b2) Di(2-ethylhexyl) sebacate (SP value: 8.9 $(cal/cm^3)^{1/2}$, kinematic viscosity at 40° C.: 11.3 $mm^2/s$, flash point: 228° C., flow point: −66° C.)

(b3) Di(2-ethylhexyl) adipate (SP value: 8.9 $(cal/cm^3)^{1/2}$, kinematic viscosity at 40° C.: 7.8 $mm^2/s$, flash point: 205° C., flow point: −68° C.)

(b4) Diisodecyl adipate (SP value: 8.9 $(cal/cm^3)^{1/2}$, kinematic viscosity at 40° C.: 14.2 $mm^2/s$, flash point: 232° C., flow point: −63° C.)

(C) Non-Polar Base Oil (c1) Polyalpha olefin (trimer of 1-decene, kinematic viscosity at 40° C.: 17.2 $mm^2/s$, flash point 222° C., flow point −68° C.)

(D) Alkylnaphthalene (d1) Monoalkylnaphthalene with alkyl groups with 16 to 18 carbons (kinematic viscosity at 40° C.: 37.0 $mm^2/s$, flash point 221° C., flow point −25° C. or less)

(E) Inorganic Cation Exchanger with Siloxane Bond (e1) Zeolite (crystal structure: mordenite type, cation exchange capacity: 160 to 190 meq/100 g)

(F) Silicone Oil (f1) Dimethyl silicone oil (SP value: 7.2 $(\text{cal/cm}^3)^{1/2}$, kinematic viscosity at 40° C.: 37.8 $\text{mm}^2/\text{s}$)

<Evaluation of Rubber-Resistant Characteristics>

Solutions of magnetic viscous fluids of Examples 1 to 14 and Comparative Examples 1 to 3, excluding magnetic particles, were prepared as solutions for evaluating rubber-resistant characteristics. 300 ml of each solution was added to a 500 cc beaker. In addition, NBR made by AS-ONE was separately cut into strips of 10 mm×60 mm×5 mm (width×length×thickness).

Next, the rubber-resistant characteristics evaluation solutions were placed in a convection oven (Advantest DRF633TA) heated to 100° C. and left for 24 hours, after which the strips of NBR were placed in the beaker and used as test samples.

After 480 hours had elapsed since the test sample was placed in the convection oven, the beaker was removed, and the NBR immersed in the magnetic viscous fluid was taken out and the oil on the NBR surface was removed using Kimwipes (registered trademark) S200 manufactured by Nippon Paper Crecia Co. The hardness (hardness after heating) of the NBR was then measured by the method described below. The hardness (initial hardness) of strips of the NBR before being placed in the beaker was also measured in the same manner.

Measurement of hardness: DUROMETER: Hardness was measured by DUROMETER ADM-E manufactured by Niigata Seiki in accordance with JIS K 6253.

Three samples were prepared for each of the test samples for Examples 1 to 14 and Comparative Examples 1 to 3, and the rubber-resistant characteristics described above were evaluated under the same conditions. The average of the hardness measurement results of NBR in those three samples was calculated. The calculation results are shown in Tables 1 and 2.

Next, the hardness change rate was calculated using the formula described below. The calculation results are shown in Tables 1 and 2.

$$\text{Hardness change rate} = [(\text{hardness after heating} - \text{initial hardness})/\text{initial hardness}] \times 100(\%)$$

Note that "–" in the hardness change rate listed in Tables 1 and 2 indicates expansion and contraction, while "+" indicates swelling.

<Evaluation of Viscosity Before and During Excitation>

3 ml of the magnetic viscous fluids of Examples 1 to 7 and Comparative Examples 1 to 2 were injected into the test plate of a TA Instruments rheometer DHR-2 equipped with the magnetic measurement option, and the viscosity (Pa·s) before excitation was measured at 20 revolutions per 100 μm gap under an atmosphere of 40° C. The viscosity during excitation was also measured using the same measuring device under the following conditions at 40° C.

Magnetic field excitation conditions: A magnetic field of 0.8 T DC was applied 5 seconds after the start of measurement, and the application of the magnetic field was stopped 215 seconds after the start of measurement.

Three samples of the magnetic viscous fluid for Examples 1 to 7 and Comparative Examples 1 to 2 were prepared for each as described above, and the viscosities before and during excitation were evaluated under the same conditions as described above. The average of the measured viscosity of NBR before and during excitation in those three samples was calculated. The calculation results are shown in Table 3.

Aging stability was evaluated by the stabilization rate A (%) and stabilization rate B (%) calculated based on the following formulas. The calculation results are shown in Table 3.

$$\text{Stabilization rate } A\ (\%) = (\text{Stabilization time } A/\text{Total applied time}) \times 100$$

The stabilization time A is the time of application corresponding to 95 to 100% of the maximum value of the viscosity during excitation.

$$\text{Stabilization rate } B\ (\%) = (\text{Stabilization time } B/\text{Total applied time}) \times 100$$

The stabilization time B is the time of application corresponding to 90 to 100% of the maximum value of the viscosity during excitation.

TABLE 1

| composition | | | | EX. 1 | EX. 2 | EX. 3 | EX. 4 | EX. 5 | EX. 6 | EX. 7 | EX. 8 |
|---|---|---|---|---|---|---|---|---|---|---|---|
| | | | | (mass %) | | | | | | | |
| prescription | magnetic particles/total amount of magnetic viscous fluid | | | 66.66 | 66.66 | 66.29 | 66.29 | 64.17 | 66.67 | 66.29 | 66.64 |
| | Ester base synthetic oil/(Ester base synthetic oil + Non-polar base oil) | | | 0.5 | 0.5 | 0.7 | 0.7 | 0.7 | 0.7 | 0.8 | 0.26 |
| | (A)Magnetic particle | | (a1)Carbonyl iron | 200 | 200 | 200 | 200 | 200 | 200 | 200 | 200 |
| | (B)Ester base oil | Hindered ester | (b1)Trimethylolpropane trioctanoate | 44.2 | 0 | 63.0 | 0 | 63.0 | 70 | 72.0 | 22.7 |
| | | Dibasic acid ester | (b2)Di(2-ethylhexyl) sebacate | 0 | 44.2 | 0 | 63.0 | 0 | 0 | 0 | 0 |
| | | | (b3)Di(2-ethylhexyl) adipate | 0 | 0 | 0 | 0 | 0 | 0 | 0 | 0 |
| | | | (b4)Diisodecyl adipate | 0 | 0 | 0 | 0 | 0 | 0 | 0 | 0 |
| | (C)Non-polar base oil | Polyalpha olefin | (c1)trimer of 1-decene | 44.2 | 44.2 | 27.0 | 27.0 | 27.0 | 30 | 18.0 | 65.7 |
| | (D)Alkylnaphthalene | | (d1)Monoalkylnaphthalene with alkyl groups with 16 to 18 carbons | 11.7 | 11.7 | 11.7 | 11.7 | 11.7 | 0 | 11.7 | 11.7 |

TABLE 1-continued

| composition | | | EX. 1 | EX. 2 | EX. 3 | EX. 4 | EX. 5 | EX. 6 | EX. 7 | EX. 8 |
|---|---|---|---|---|---|---|---|---|---|---|
| | | | (mass %) | | | | | | | |
| | (E)Inorganic cation exchanger with siloxane bond | (e1)Zeolite | 0 | 0 | 0 | 0 | 5 | 0 | 0 | 0 |
| | (F)Silicone oil | (f1)Dimethyl silicone oil | 0 | 0 | 0 | 0 | 5 | 0 | 0 | 0 |
| experimental results | Non-polarity index (NPI) | | 25.6 | 27.7 | 35.8 | 38.8 | 35.8 | 35.8 | 35.8 | 14.4 |
| | Hardness of NBR in rubber resistance test | Before Experiment | 82 | 82 | 82 | 82 | 82 | 82 | 82 | 82 |
| | | After Experiment | 81 | 81 | 82 | 85 | 82 | 84 | 85 | 80 |
| | Hardness change rate (%) | | −1.2 | −1.2 | 0.0 | 3.7 | 0.0 | 2.4 | 3.7 | −2.4 |

"−" in the hardness change rate indicates expansion and contraction, while "+" indicates swelling.

TABLE 2

| composition | | | | Comp. 1 | Comp. 2 | EX. 9 | EX. 10 | EX. 11 |
|---|---|---|---|---|---|---|---|---|
| | | | | (mass %) | | | | |
| prescription | magnetic particles/total amount of magnetic viscous fluid | | | 64.16 | 64.17 | 66.65 | 66.65 | 66.29 |
| | Ester base synthetic oil/(Ester base synthetic oil + Non-polar base oil) | | | 1.0 | 1.0 | 0.26 | 0.5 | 0.7 |
| | (A)Magnetic particle | | (a1)Carbonyl iron | 200 | 200 | 200 | 200 | 200 |
| | (B)Ester base oil | Hindered ester | (b1)Trimethylolpropane trioctanoate | 100 | 0 | 0 | 0 | 0 |
| | | Dibasic acid ester | (b2)Di(2-ethylhexyl) sebacate | 0 | 100 | 0 | 0 | 0 |
| | | | (b3)Di(2-ethylhexyl) adipate | 0 | 0 | 22.7 | 44.2 | 63.0 |
| | | | (b4)Diisodecyl adipate | 0 | 0 | 0 | 0 | 0 |
| | (C)Non-polar base | Polyalpha olefin | (c1)trimer of 1-decene | 0 | 0 | 65.7 | 44.2 | 27.0 |
| | (D)Alkylnaphthalene | | (d1)Monoalkylnaphthalene with alkyl groups with 16 to 18 carbons | 11.7 | 11.7 | 11.7 | 11.7 | 11.7 |
| | (E)Inorganic cation exchanger with siloxane bond | | (e1)Zeolite | 0 | 0 | 0 | 0 | 0 |
| | (F)Silicone oil | | (f1)Dimethyl silicone oil | 0 | 0 | 0 | 0 | 0 |
| experimental results | Non-polarity index (NPI) | | | 51.2 | 55.4 | 10.5 | 20.4 | 28.5 |
| | Hardness of NBR in rubber resistance test | | Before Experiment | 82 | 82 | 82 | 82 | 82 |
| | | | After Experiment | 91 | 90 | 80.7 | 82.3 | 83 |
| | Hardness change rate (%) | | | 11.0 | 9.8 | −1.6 | 0.4 | 1.2 |

| composition | | | | EX. 12 | EX. 13 | EX. 14 | Comp. 3 |
|---|---|---|---|---|---|---|---|
| | | | | (mass %) | | | |
| prescription | magnetic particles/total amount of magnetic viscous fluid | | | 66.65 | 66.65 | 66.29 | 64.17 |
| | Ester base synthetic oil/(Ester base synthetic oil + Non-polar base oil) | | | 0.26 | 0.5 | 0.7 | 1.0 |
| | (A)Magnetic particle | | (a1)Carbonyl iron | 200 | 200 | 200 | 200 |
| | (B)Ester base oil | Hindered ester | (b1)Trimethylolpropane trioctanoate | 0 | 0 | 0 | 0 |
| | | Dibasic acid ester | (b2)Di(2-ethylhexyl) sebacate | 0 | 0 | 0 | 0 |
| | | | (b3)Di(2-ethylhexyl) adipate | 0 | 0 | 0 | 0 |
| | | | (b4)Diisodecyl adipate | 22.7 | 44.2 | 63.0 | 100 |
| | (C)Non-polar base | Polyalpha olefin | (c1)trimer of 1-decene | 65.7 | 44.2 | 27.0 | 0 |
| | (D)Alkylnaphthalene | | (d1)Monoalkylnaphthalene with alkyl groups with 16 to 18 carbons | 11.7 | 11.7 | 11.7 | 11.7 |
| | (E)Inorganic cation exchanger with siloxane bond | | (e1)Zeolite | 0 | 0 | 0 | 0 |
| | (F)Silicone oil | | (f1)Dimethyl silicone oil | 0 | 0 | 0 | 0 |
| experimental results | Non-polarity index (NPI) | | | 14.4 | 27.7 | 38.8 | 55.4 |
| | Hardness of NBR in rubber resistance test | | Before Experiment | 82 | 82 | 82 | 82 |
| | | | After Experiment | 81 | 82.3 | 85 | 90 |
| | Hardness change rate (%) | | | −1.2 | 0.4 | 3.7 | 9.8 |

"−" in the hardness change rate indicates expansion and contraction, while "+" indicates swelling.

TABLE 3

| composition | | | | EX. 1 | EX. 2 | EX. 3 (mass %) | EX. 4 | EX. 5 |
|---|---|---|---|---|---|---|---|---|
| prescription | magnetic particles/total amount of magnetic viscous fluid | | | 66.66 | 66.66 | 66.29 | 66.29 | 64.17 |
| | Ester base synthetic oil/(Ester base synthetic oil + Non-polar base oil) | | | 0.5 | 0.5 | 0.7 | 0.7 | 0.7 |
| | (A)Magnetic particle | | (a1)Carbonyl iron | 200 | 200 | 200 | 200 | 200 |
| | (B)Ester base oil | Hindered ester | (b1)Trimethylolpropane trioctanoate | 44.2 | 0 | 63.0 | 0 | 63.0 |
| | | Dibasic acid ester | (b2)Di(2-ethylhexyl) sebacate | 0 | 44.2 | 0 | 63.0 | 0 |
| | (C)Non-polar base oil | Polyalpha olefin | (c1)trimer of 1-decene | 44.2 | 44.2 | 27.0 | 27.0 | 27.0 |
| | (D)Alkylnaphthalene | | (d1)Monoalkylnaphthalene with alkyl groups with 16 to 18 carbons | 11.7 | 11.7 | 11.7 | 11.7 | 11.7 |
| | (E)Inorganic cation exchanger with siloxane bond | | (e1)Zeolite | 0 | 0 | 0 | 0 | 5 |
| | (F)Silicone oil | | (f1)Dimethyl silicone oil | 0 | 0 | 0 | 0 | 5 |
| experimental results | Viscosity during excitation (0.8 T, 40° C., Pa · s) | | Max | 259.3 | 253.0 | 275.8 | 275.5 | 264.7 |
| | stabilization ratio | | stabilization ratio A(%) | 86.7 | 74.3 | 74.8 | 67.1 | 99.0 |
| | | | stabilization ratio B(%) | 97.6 | 88.1 | 91.4 | 88.1 | 99.0 |
| | Viscosity before excitation (0.8 T, 40° C., Pa · s) | | | 0.03 | 0.05 | 0.09 | 0.37 | 0.31 |

| composition | | | | EX. 6 | EX. 7 | Comp. 1 (mass %) | Comp. 2 |
|---|---|---|---|---|---|---|---|
| prescription | magnetic particles/total amount of magnetic viscous fluid | | | 66.67 | 66.29 | 64.16 | 64.17 |
| | Ester base synthetic oil/(Ester base synthetic oil + Non-polar base oil) | | | 0.7 | 0.8 | 1.0 | 1.0 |
| | (A)Magnetic particle | | (a1)Carbonyl iron | 200 | 200 | 200 | 200 |
| | (B)Ester base oil | Hindered ester | (b1)Trimethylolpropane trioctanoate | 70 | 72.0 | 100 | 0 |
| | | Dibasic acid ester | (b2)Di(2-ethylhexyl) sebacate | 0 | 0 | 0 | 100 |
| | (C)Non-polar base oil | Polyalpha olefin | (c1)trimer of 1-decene | 30 | 18.0 | 0 | 0 |
| | (D)Alkylnaphthalene | | (d1)Monoalkylnaphthalene with alkyl groups with 16 to 18 carbons | 0 | 11.7 | 11.7 | 11.7 |
| | (E)Inorganic cation exchanger with siloxane bond | | (e1)Zeolite | 0 | 0 | 0 | 0 |
| | (F)Silicone oil | | (f1)Dimethyl silicone oil | 0 | 0 | 0 | 0 |
| experimental results | Viscosity during excitation (0.8 T, 40° C., Pa · s) | | Max | 285.0 | 282.9 | 260.8 | 262.9 |
| | stabilization ratio | | stabilization ratio A(%) | 81.9 | 79.5 | 85.2 | 78.1 |
| | | | stabilization ratio B(%) | 92.9 | 89.5 | 96.2 | 90.5 |
| | Viscosity before excitation (0.8 T, 40° C., Pa · s) | | | 0.09 | 0.03 | 0.23 | 0.19 |

Examples 1 to 14 are all magnetic viscous fluids containing magnetic particles and base oil, where the base oil contains ester base oil and non-polar base oil, and the non-polarity index of the base oil ranges from 10 to 45. Therefore, in Examples 1 to 7, the maximum value of viscosity during excitation was 230 Pa·s or more, indicating good drag force during excitation. In addition, the absolute values of the hardness change rate for NBR in Examples 1 to 14 were all less than 5%, indicating good rubber-resistant characteristics.

Furthermore, in Examples 1 to 7, the stabilization ratio B was 80% or more, indicating good aging stability of drag force during excitation.

On the other hand, in Comparative Examples 1 to 3, the magnetic viscous fluid did not contain non-polar base oil, resulting in a hardness change rate of 9% or more for NBR, and rubber-resistant characteristics were poor.

FIG. 1 shows the relationship between the non-polarity indexes and the hardness change rate of NBR of Examples 1 to 4, 7 to 14, and Comparative Examples 1 to 3 in Tables 1 and 2. The graph in FIG. 1 shows that when the non-polarity index of the base oil is in the range of 10 to 45, the hardness change rate is 5% or less, indicating good rubber-resistant characteristics.

The invention claimed is:

1. A magnetic viscous fluid comprising a magnetic particle, base oil and an alkylnaphthalene having an alkyl group with 10 to 24 carbons, further comprising an inorganic cation exchanger with a siloxane bond, and silicone oil, and not comprising coloring agents, wherein the base oil comprises ester base oil and non-polar base oil, and a non-polarity index of the base oil is in the range of 10 to 45.

2. The magnetic viscous fluid according to claim 1, wherein the ester base oil is at least one selected from a hindered ester and a dibasic acid ester.

3. A mechanical device comprising the magnetic viscous fluid according to claim 1.

4. A magnetic viscous fluid comprising a magnetic particle, base oil, an alkylnaphthalene having an alkyl group with 10 to 24 carbons, an inorganic cation exchanger with a siloxane bond, and silicone oil, wherein the base oil comprises ester base oil and non-polar base oil, and a non-polarity index of the base oil is in the range of 10 to 45.

5. The magnetic viscous fluid according to claim 4, wherein the ester base oil is at least one selected from a hindered ester and a dibasic acid ester.

6. A mechanical device comprising the magnetic viscous fluid according to claim 4.

* * * * *